United States Patent
Zhao et al.

(10) Patent No.: US 7,643,838 B2
(45) Date of Patent: Jan. 5, 2010

(54) INTEGRITY PROTECTION COUNT SYNCHRONIZATION METHOD

(75) Inventors: Hui Zhao, Lindenhurst, IL (US); Padmaja Putcha, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 584 days.

(21) Appl. No.: 11/238,503

(22) Filed: Sep. 29, 2005

(65) Prior Publication Data

US 2007/0072635 A1    Mar. 29, 2007

(51) Int. Cl.
*H04N 7/00* (2006.01)
*H04N 15/00* (2006.01)

(52) U.S. Cl. ............... 455/502; 455/436; 455/411; 370/350; 370/331; 370/503

(58) Field of Classification Search ............ 380/247, 380/249, 250, 258, 259, 260, 262, 264, 270, 380/277–285; 370/278, 282, 329, 328, 338, 370/350, 331–334, 503; 455/410, 411, 435.1, 455/414.1, 13.2, 436–444, 500, 502
See application file for complete search history.

(56) References Cited

U.S. PATENT DOCUMENTS

| | | | |
|---|---|---|---|
| 6,768,903 B2* | 7/2004 | Fauconnier et al. | 455/403 |
| 7,009,940 B2* | 3/2006 | Vialen et al. | 370/252 |
| 7,120,132 B2* | 10/2006 | Choi et al. | 370/324 |
| 2001/0046240 A1* | 11/2001 | Longoni et al. | 370/503 |
| 2003/0100291 A1* | 5/2003 | Krishnarajah et al. | 455/410 |
| 2003/0235212 A1 | 12/2003 | Kuo | |
| 2003/0236085 A1* | 12/2003 | Ho | 455/411 |
| 2004/0039910 A1* | 2/2004 | Isokangas et al. | 713/171 |

FOREIGN PATENT DOCUMENTS

| | | |
|---|---|---|
| EP | 1448009 A2 | 8/2004 |
| WO | 0165883 A1 | 9/2001 |

OTHER PUBLICATIONS

"3$^{rd}$ Generation Partnership Project; Technical Specification Group Radio Access Network; Radio Resource Control (RRC); Protocol Specification (Release 6)", 3GPP TS 25.331 V6.6.0 (Jun. 2005) Technical Specification, pp. 1-28, 91-93, 98-101, 243-244, 258.

* cited by examiner

*Primary Examiner*—Sujatha Sharma
(74) *Attorney, Agent, or Firm*—Sylvia Chen

(57) ABSTRACT

An integrity protection count synchronization method (200) initiates (210) a new connection when a user equipment (UE) is already in connected mode with a network. If new security keys are pending, the UE sends (250) a START value of zero in an initial direct transfer message. If no new security keys are pending, the UE sends (240) a non-zero START value based on a Universal Subscriber Interface Module (USIM). Sending a START value of zero when new security keys are pending at the UE forces the network's COUNT-I integrity count value to match the zero COUNT-I value at the UE, which prevents call set-up failure due to inability to pass an integrity protection security check.

12 Claims, 6 Drawing Sheets

INTEGRITY PROTECTION COUNT SYNCHRONIZATION METHOD

FIELD OF THE DISCLOSURE

This disclosure relates generally to radiotelephone communications and, in particular, integrity checking of signaling messages between a mobile station and a network.

BACKGROUND OF THE DISCLOSURE

According to Third Generation Partnership Project (3GPP) Technical Specification 25.331, a User Equipment (UE) can initiate a signaling connection using an initial direct transfer (IDT) procedure that includes calculating a START value for a security mode command procedure. This START value is sent from the UE to its communicating network, and the network uses the received START value to initialize a COUNT-I variable that is used for integrity protection of messages between the UE and the network.

If, however, connection failures cause a signal connection release prior to the security mode command procedure completing, the START value sent in an IDT may not be the same as the START value used at the UE, and the integrity check for messages could fail. Subsequent attempts to establish a replacement connection using the IDT procedure will also fail due to an inability to sustain integrity protection.

There is an opportunity for a UE to compensate for COUNT mismatches to improve the chances that a replacement connection will succeed. The various aspects, features and advantages of the disclosure will become more fully apparent to those having ordinary skill in the art upon careful consideration of the following Drawings and accompanying Detailed Description.

DETAILED DESCRIPTION

An integrity protection count synchronization method synchronizes a 3GPP network's COUNT-I value with a 3GPP User Equipment COUNT-I value even when a signaling connection is released after the successful completion of security mode procedure. This method gives re-connection attempts a greater chance to succeed and prevents call set-up failures due to an inability to perform integrity protection. A decision-point, based on whether un-used keys from a previous connection attempt are available at a UE, ensures that the integrity protection COUNT values for the UE and network will be synchronized.

Figure 1:
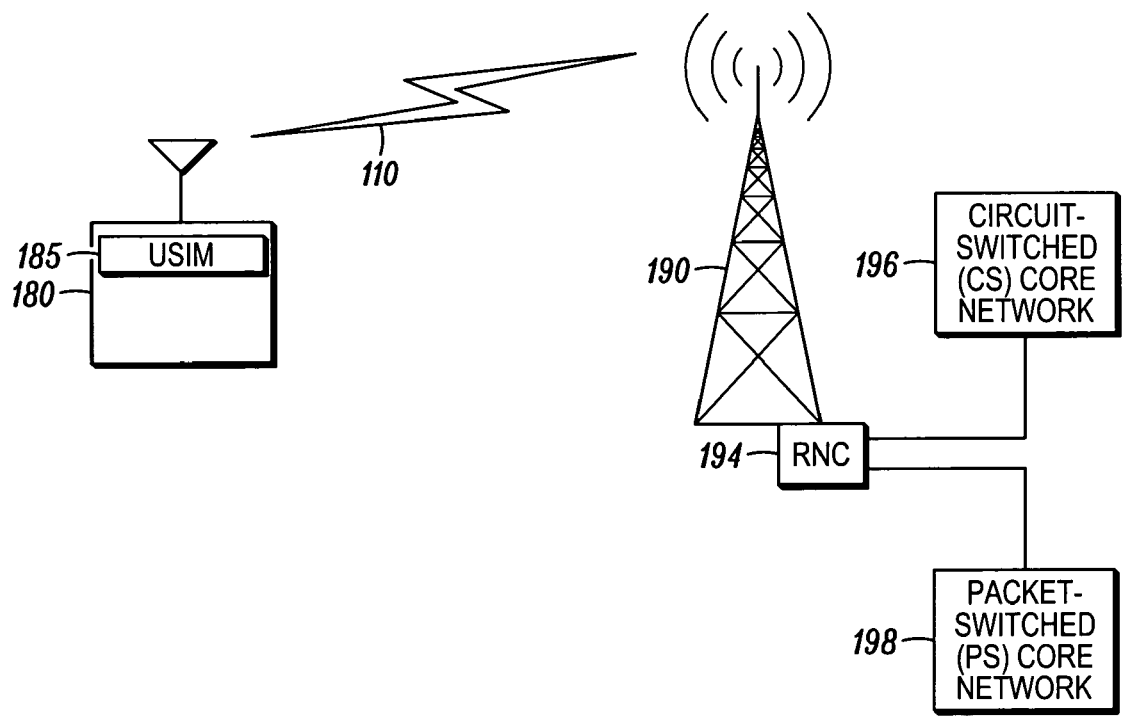
FIG. 1 shows a simplified 3GPP system with User Equipment and a network according an embodiment.

FIG. 1 shows a simplified 3GPP system 100 with User Equipment (UE) 180 and a network 190 according to an embodiment. In the embodiments discussed, a 3GPP wireless communication system is shown; however, the principles disclosed may be applied to other types of wireless communication systems including future versions of the 3GPP system. The UE 180, sometimes referred to as a mobile device or mobile station, can be a radiotelephone, laptop with wireless connection, wireless messaging device, or other type of wireless communication device compatible with the network 190. The UE 180 has or is coupled to a Universal Subscriber Interface Module (USIM) 185.

The network 190 includes a circuit-switched (CS) core network 196 as well as a packet-switched (PS) core network 198. The CS core network 196 and the PS core network 198 operate independently of each other. For example, the PS core network may have a call connection established with the UE 180, and the CS core network may initiate a call connection at a later time that is not coordinated with the PS core network connection. The CS core network 196 and the PS core network 198 come together at a Radio network Controller (RNC) 194 radio resource control (RRC) and a radio link control (RLC) entity within the network 190 and thus both PS and CS messages are transmitted across a wireless communication link 110 to the UE 180. The UE 180 also communicates to the network 190 across the wireless communication link 110.

Figure 2:
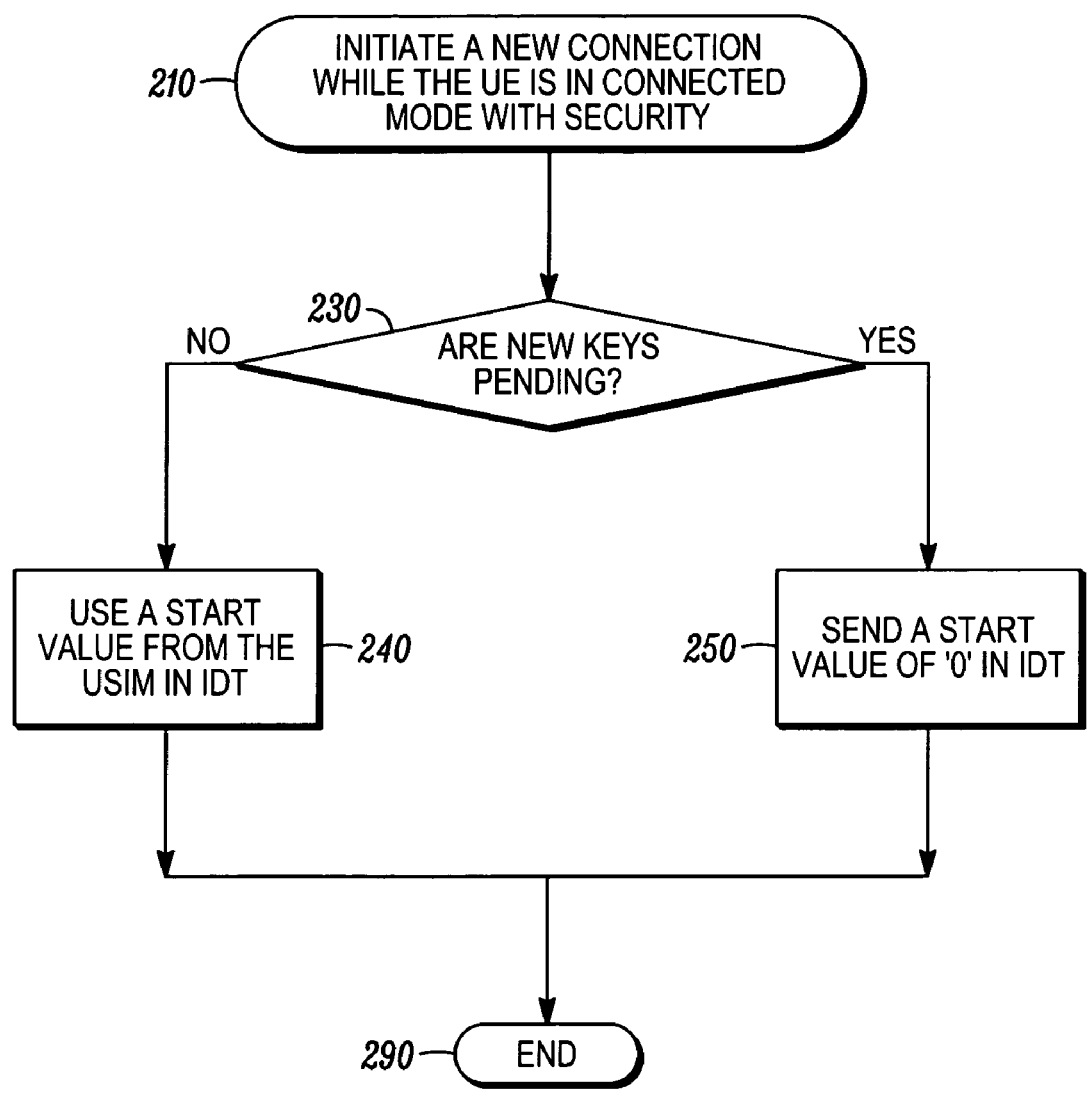
FIG. 2 shows a flowchart of a count synchronization method for the User Equipment shown in FIG. 1 according to a general embodiment.

FIG. 2 shows a flowchart 200 of a count synchronization method for the UE 180 shown in FIG. 1 according to a general embodiment. In step 210, the UE 180 initiates a new connection when the UE is already in a connected mode with security (also called integrity protection). Two scenarios are common. In the first scenario, the UE is already connected to the circuit-switched (CS) core network 196 shown in FIG. 1 and is initiating a packet-switched (PS) call in step 210. In the second scenario, the UE is already connected to the PS core network 198 shown in FIG. 1 and is initiating a CS call in step 210.

In step 230, the UE 180 checks for unused pending keys by checking a binary variable PENDING_NEW_KEYS stored in a memory, such as random access memory (RAM) of the UE 180. Pending new keys are present when an authentication procedure is successfully completed between the UE 180 and the network 190 for a particular connection. The absence of new keys indicates that no authentication procedure between the UE 180 and the network 190 was completed for that particular connection.

If no new keys are pending, as determined by step 230, the UE 180 transmits an Initial Direct Transfer (IDT) message having a non-zero START value determined from the Universal Subscriber Interface Module (USIM) 185 of the UE 180 in accordance with existing 3GPP TS 25.331 procedures, and the flow ends at step 290.

If new keys are pending, as determined by step 230, the UE 180 transmits an IDT message having a START value of '0.' A zero START value indicates to the network that its existing COUNT-I value should be reset to zero for the newly-initiated connection. The flow then ends at step 290.

According to existing 3GPP TS 25.331 procedures, if new keys are pending at the UE 180, the UE's COUNT-I value is reset to zero. Sending a START value of '0' to the network 190 in step 350 forces the network's COUNT-I value to match the zero COUNT-I value at the UE 180. If a non-zero START value were sent under these circumstances, then the UE's COUNT-I value would be zero and the network's COUNT-I would be non-zero, which would result in call set-up failure due to inability to pass the integrity protection check.

Figure 3:
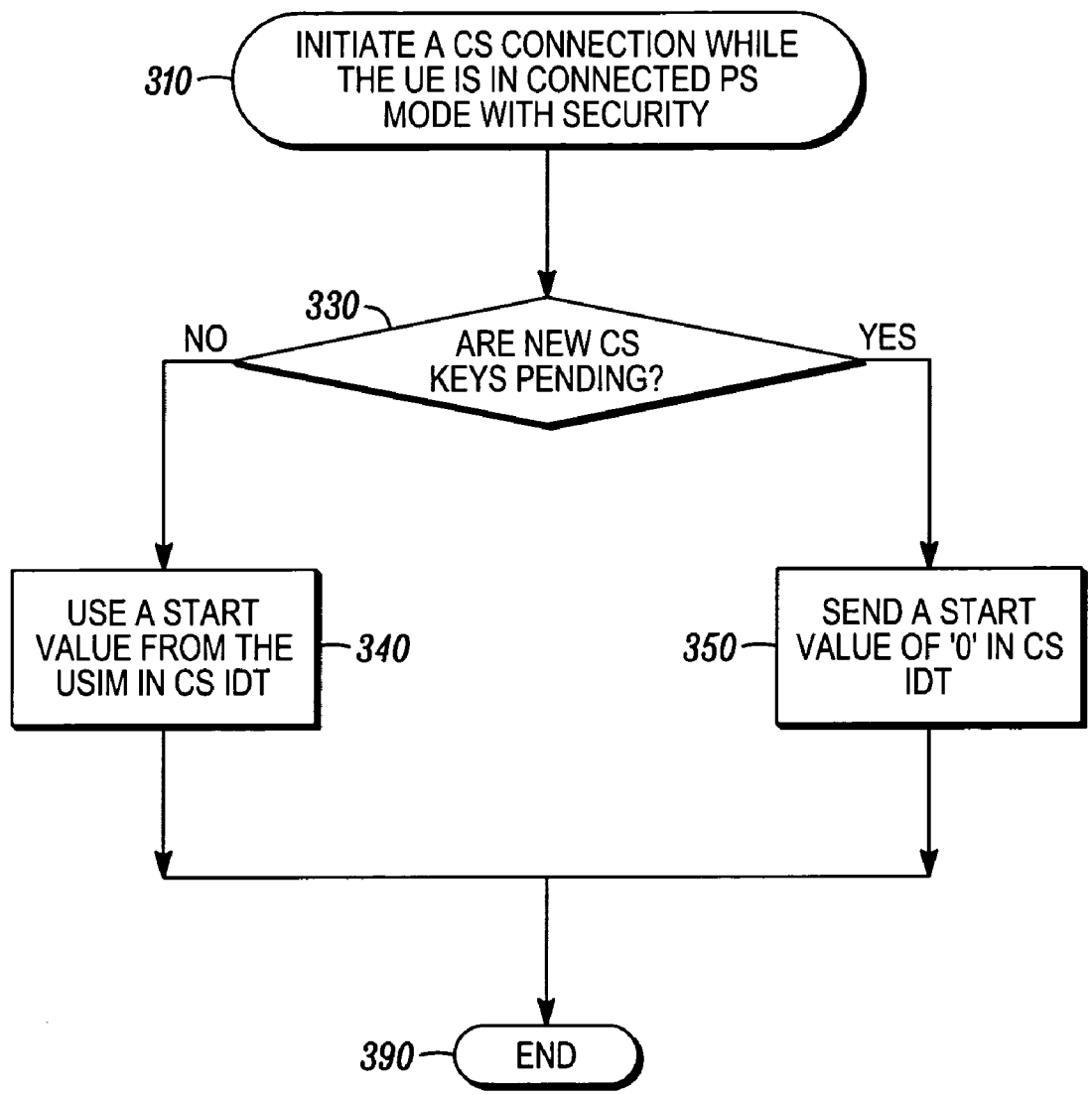
FIG. 3 shows a flowchart of a count synchronization method for the User Equipment shown in FIG. 1 according to a first detailed embodiment.

FIG. 3 shows a flowchart of a count synchronization method for the User Equipment shown in FIG. 1 according to a first detailed embodiment. FIG. 3 is very similar to FIG. 2 except that step 310 specifies that the UE initiates a CS connection when the UE is already in a PS connected mode with security. A signal flow example of this scenario is shown in FIG. 4.

Figure 4:
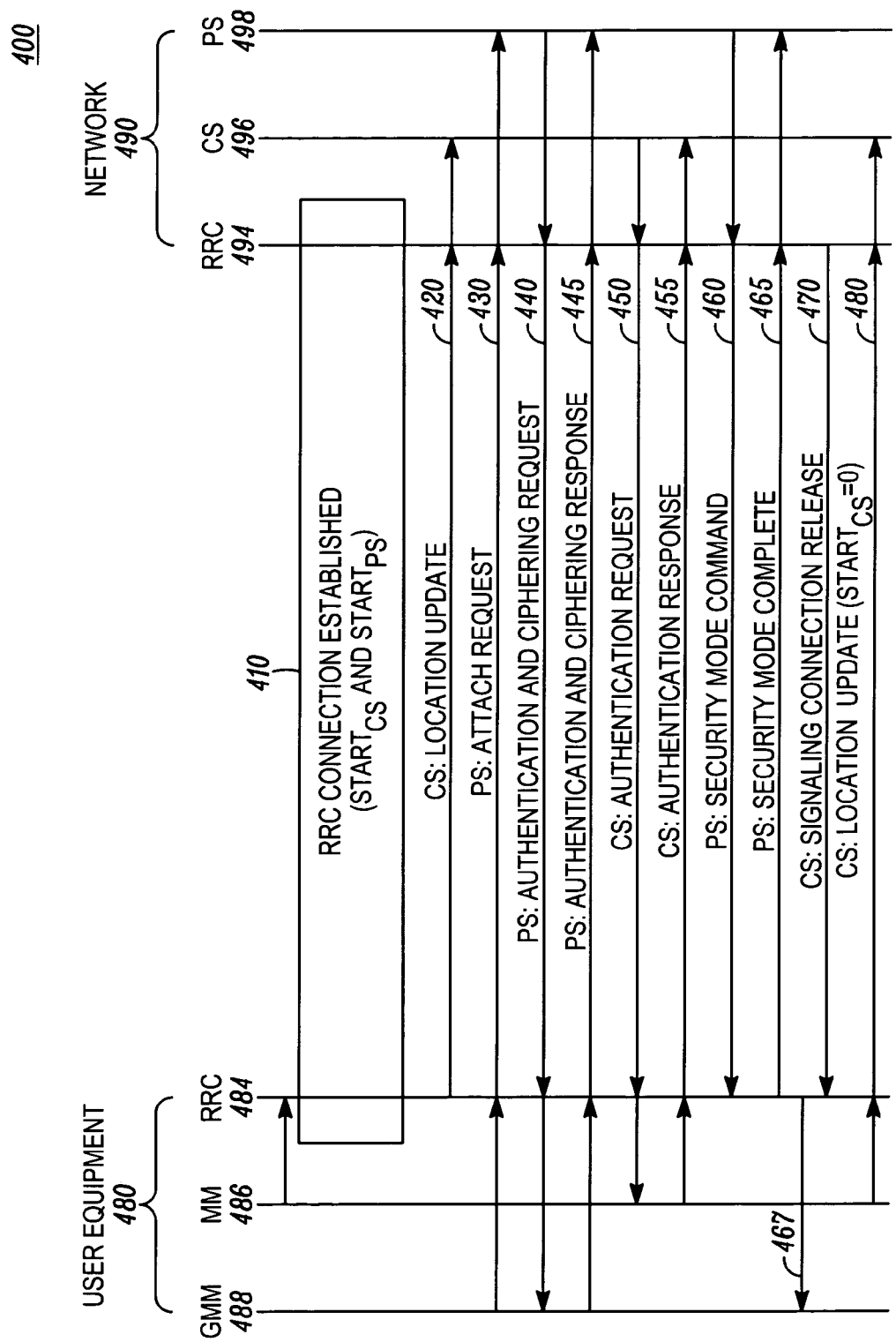
FIG. 4 shows a first example signal flow diagram for a count synchronization method in the 3GPP system shown in FIG. 1 according to the first detailed embodiment.

FIG. 4 shows a first example signal flow diagram 400 for a count synchronization method in the 3GPP system 100 shown in FIG. 1 according to the first detailed embodiment. In this first example, a CS signaling connection release 470 occurs after a CS authentication procedure completes successfully. Instead of including a non-zero START value, the CS location update message 480 of the initial direct transfer (IDT) procedure includes a START value of 0.

This first example signal flow diagram 400 shows three layers in a UE 480: a radio resource control (RRC) layer 484, a circuit-switched domain mobility management (MM) layer 486, and a packet-switched domain GPRS mobility management (GMM) layer 488. The MM layer 486 used in the CS domain is analogous to the GMM layer 488 in the PS domain; both are mobility management layers.

Three layers of a network 490 are also shown in the first example signal flow diagram 400. The network 490 has a radio resource control (RRC) layer 494 which is a counterpart to the RRC layer 484 in the UE 480. The network 490 also has a CS core network 496 and a PS core network 498, which are shown in FIG. 1 as CS core network 196 and PS core network 198. As stated previously, the CS core network 496 and the PS core network 498 operate independently of each other.

A CS location update message 420 generated by the circuit-switched MM layer 486 triggers an RRC connection 410 establishment between the UE 480 and the network 490 using various messages. During the establishment of the RRC connection 410, the UE 480 sends the network 490 START values ($START_{CS}$, $START_{PS}$) from the USIM. The UE's $START_{CS}$ value is used to initiate the network's $COUNT-I_{CS}$ value for the CS connection, and the UE's $START_{PS}$ value is used to initiate the network's $COUNT-I_{PS}$ value for the PS connection. As stated previously, the network's COUNT-I value and a corresponding COUNT-I value at the UE are used to perform integrity protection when the UE and network are in a security mode.

Next, the CS location update message 420 generated by the circuit-switched MM layer 486 is transmitted from the RRC layer 484 of the UE 480. The message is received at the RRC layer 494 of the network 490 and forwarded to the CS core network 496 for processing. On the packet-switching side, an attach request message 430 is generated at the packet-switched GMM layer 488 and transmitted from the RRC layer 484 of the UE 480. The network 490 receives the message and sends it from the RRC layer 494 to the PS core network 498. The CS location update message 420 and the PS attach request message 430 are not coordinated with each other and can occur in any time sequence.

In response to the PS attach request message 430, the network 490 sends a PS authentication & ciphering request message 440. The authentication & ciphering request is generated by the PS core network 498 and sent through the RRC layer 494. The UE 480 receives the message at its RRC layer 484 and forwards it to the GMM layer 488 for processing. Once processing is completed, the GMM layer 488 produces an authentication & ciphering response message 445, which is sent to the RRC layer 484 for transmission by the UE 480.

The message 445 is received by the RRC layer 494 of the network 490 and passed to the PS core 498.

In the meantime, in response to the location update message 420, the CS core network 496 has initiated an authentication request message 450. The MM 486 of the UE 480 responds with a CS authentication response message 455 for the CS connection. The authentication response message 455 is forwarded from the RRC layer 494 of the network 490 to the CS core 496.

After the PS authentication & ciphering response message 445 is received by the PS core 498 of the network 490, the PS core 498 sends a PS security mode command message 460 to initiate integrity protection for the PS connection between the UE 480 and the network 490. When the RRC layer 484 of the UE 480 receives the PS security mode command message 460 from the RRC layer 494 of the network, the UE 480 starts integrity protection. When the initiation of security mode is completed at the RRC layer 484, the UE 480 notifies the network 490 using PS security mode complete message 465 and notifies its packet-switched GMM layer 488 using a message 467.

At this point, the CS signaling connection is released 470 prior to the successful completion of the CS security mode procedure, and the CS keys remain unused. If a CS connection is originated again, the UE 480 sends an initial direct transfer (IDT) by sending a location update message 480 including a $START_{CS}$ value of 0. The UE 480 will use the unused CS keys when a CS security mode procedure is initiated. The zero START value in the location update message 480 will force the network's $COUNT-I_{CS}$ value to reset to zero, which will then match the zero $COUNT-I_{CS}$ value at the UE 480.

When the network's $COUNT-I_{CS}$ value and the UE's $COUNT-I_{CS}$ match, the newly-initiated CS replacement connection can use the previous connection's security keys to establish integrity protection and the call set-up will not fail due to an inability to sustain the security mode.

Without the flowchart 300 shown in FIG. 3, the location update message 480 would have included the $START_{CS}$ value from the USIM in accordance with standard IDT procedures. The $START_{SC}$ value from the USIM would have been a non-zero value that would have caused a mismatch between the network's $COUNT-I_{CS}$ value and the UE's $COUNT-I_{CS}$ value, which would have prevented the re-connection's call-up from succeeding.

Figure 5:
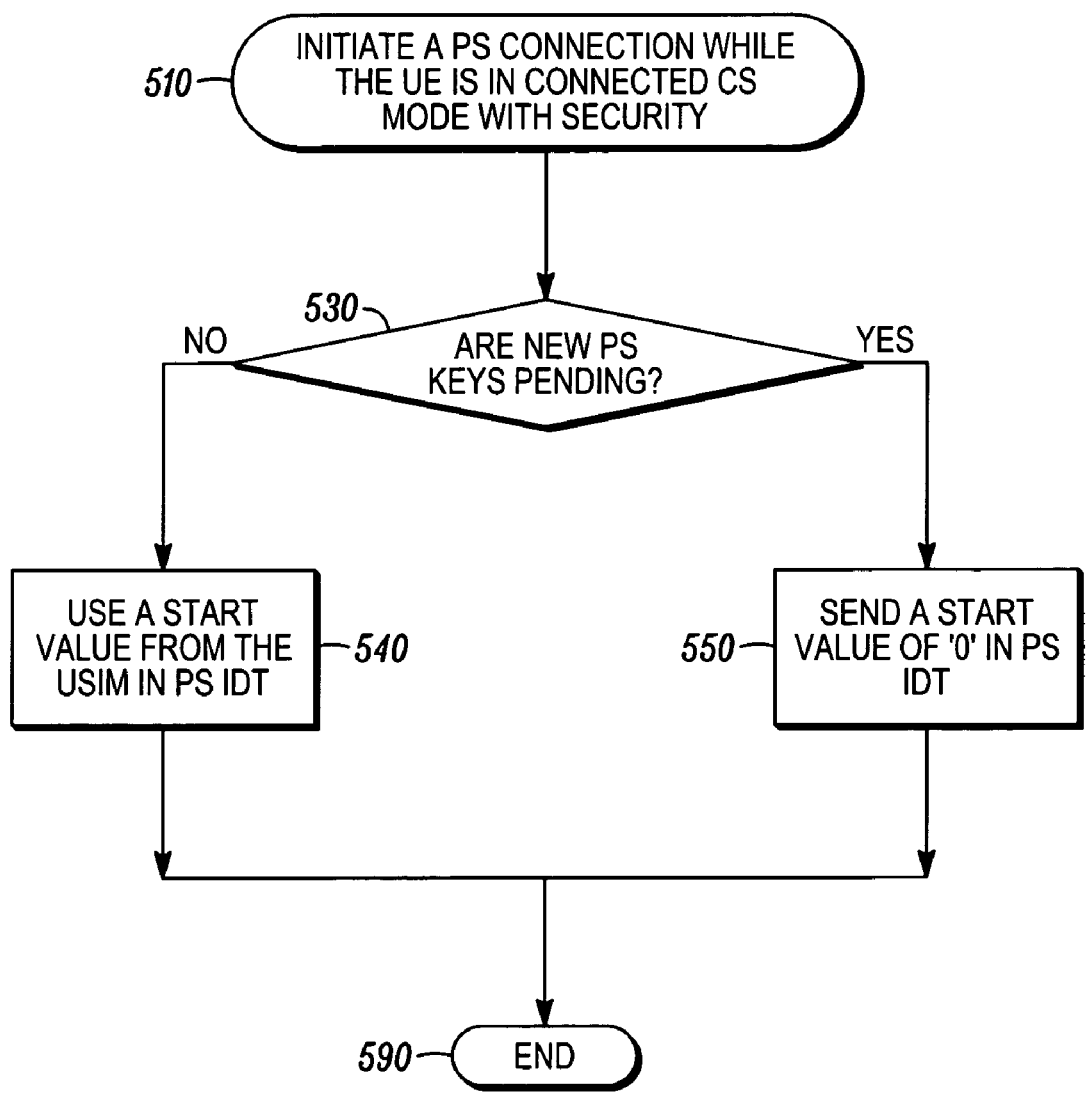
FIG. 5 shows a flowchart of a count synchronization method for the User Equipment shown in FIG. 1 according to a second detailed embodiment.

FIG. 5 shows a flowchart of a count synchronization method for the User Equipment shown in FIG. 1 according to a second detailed embodiment. FIG. 5 is very similar to FIG. 2 except that step 510 specifies that the UE initiates a PS connection when the UE is already in a CS connected mode with security. A signal flow example of this scenario is shown in FIG. 6.

Figure 6:
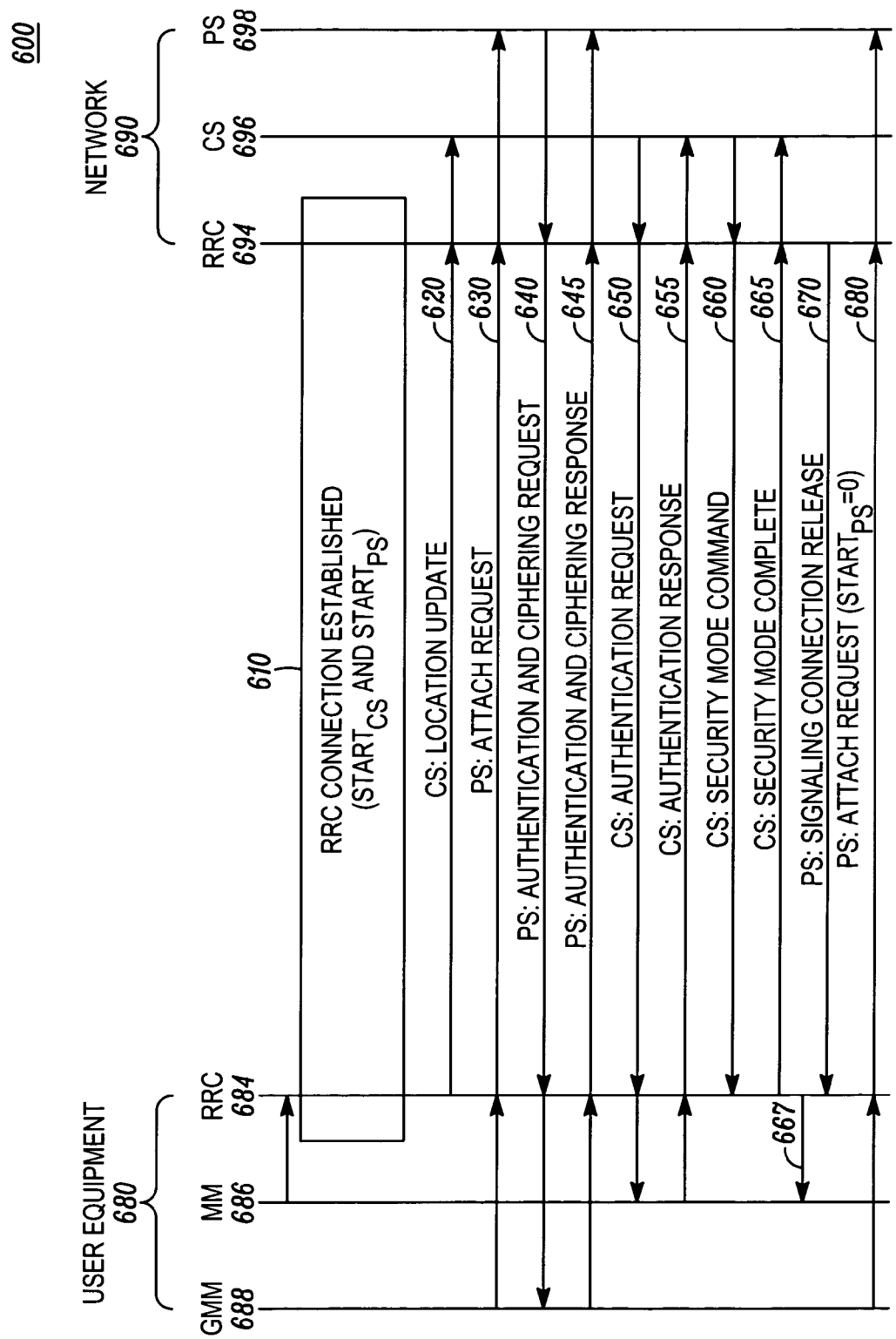
FIG. 6 shows a second example signal flow diagram for a count synchronization method in the 3GPP system shown in FIG. 1 according to the second detailed embodiment.

FIG. 6 shows a second example signal flow diagram 600 for a count synchronization method in the 3GPP system 100 shown in FIG. 1 according to the second detailed embodiment. In this second example, a PS signaling connection release 670 occurs after a PS authentication procedure completes successfully. Instead of including a non-zero START value, the PS attach request message 680 of the initial direct transfer (IDT) procedure includes a START value of 0.

This second example signal flow diagram 600 shows three layers in a UE 680: a radio resource control (RRC) layer 684, a circuit-switched domain mobility management (MM) layer 686, and a packet-switched domain GPRS mobility management (GMM) layer 688. The MM layer 686 used in the CS domain is analogous to the GMM layer 688 in the PS domain; both are mobility management layers.

Three layers of a network 690 are also shown in the first example signal flow diagram 600. The network 690 has a radio resource control (RRC) layer 694 which is a counterpart to the RRC layer 684 in the UE 680. The network 690 also has a CS core network 696 and a PS core network 698, which are shown in FIG. 1 as CS core network 196 and PS core network 198. As stated previously, the CS core network 696 and the PS core network 698 operate independently of each other.

A CS location update message 620 generated by the circuit-switched MM layer 686 triggers an RRC connection 610 establishment between the UE 680 and the network 690 using various messages. During the establishment of the RRC connection 610, the UE 680 sends the network 690 START values (START$_{CS}$, START$_{PS}$) from the USIM. The UE's START$_{CS}$ value is used to initiate the network's COUNT-I$_{CS}$ value for the CS connection, and the UE's START$_{PS}$ value is used to initiate the network's COUNT-I$_{PS}$ value for the PS connection. As stated previously, the network's COUNT-I value and a corresponding COUNT-I value at the UE are used to perform integrity protection when the UE and network are in a security mode.

Next, the CS location update message 620 generated by the circuit-switched MM layer 686 is transmitted from the RRC layer 684 of the UE 680. The message is received at the RRC layer 694 of the network 690 and forwarded to the CS core network 696 for processing. On the packet-switching side, an attach request message 630 is generated at the packet-switched GMM layer 688 and transmitted from the RRC layer 684 of the UE 680. The network 690 receives the message and sends it from the RRC layer 694 to the PS core network 698. The CS location update message 620 and the PS attach request message 630 are not coordinated with each other and can occur in any time sequence.

In response to the PS attach request message 630, the network 690 sends a PS authentication & ciphering request message 640. The authentication & ciphering request is generated by the PS core network 698 and sent through the RRC layer 694. The UE 680 receives the message at its RRC layer 684 and forwards it to the GMM layer 688 for processing. Once processing is completed, the GMM layer 688 produces an authentication & ciphering response message 645, which is sent to the RRC layer 684 for transmission by the UE 680. The message 645 is received by the RRC layer 694 of the network 690 and passed, to the PS core 698.

In the meantime, in response to the location update message 620, the CS core network 696 has initiated an authentication request message 650. The MM 686 of the UE 680 responds with a CS authentication response message 655 for the CS connection. The authentication response message 655, is forwarded from the RRC layer 694 of the network 690 to the CS layer 696.

After the CS authentication response message 655 is received by the CS layer 696 of the network 690, the CS layer 696 sends a CS security mode command message 660 to initiate integrity protection for the CS connection between the UE 680 and the network 690. When the RRC layer 684 of the UE 680 receives the CS security mode command message 660 from the RRC layer 694 of the network, the UE 680 starts integrity protection. When the initiation of security mode is completed at the RRC layer 684, the UE 680 notifies the network 690 using CS security mode complete message 665 and notifies its circuit-switched MM layer 686 using a message 667.

At this point, the PS signaling connection is released 670 prior to the successful completion of security mode procedure, and the security keys remain unused. If a PS connection is originated again, the UE 680 sends an initial direct transfer (IDT) by sending an attach request message 680 including a START$_{PS}$ value of 0. The UE 680 will use the unused PS keys when a PS security mode procedure is initiated. The zero START value in the attach request message 680 will force the COUNT-I$_{PS}$ value to be zero, which will then match the zero COUNT-I$_{PS}$ value at the UE 680.

When the network's COUNT-I$_{PS}$ value and the UE's COUNT-I$_{PS}$ match, the newly-initiated PS replacement connection can use the previous connection's security keys to establish integrity protection and the call set-up will not fail due to an inability to sustain the security mode.

Without the flowchart 500 shown in FIG. 5, the attach request message 680 would have included START$_{PS}$ value from the USIM in accordance with standard IDT procedures. The START$_{PS}$ value from the USIM could be a non-zero value that would have caused a mismatch between the network's COUNT-I$_{PS}$ value and the UE's COUNT-I$_{PS}$ value, which would have prevented the re-connection's call-up from succeeding.

Thus, a count synchronization method synchronizes a network's COUNT-I value with a UE's COUNT-I value even when a signaling connection is released prior to the successful completion of security mode procedure. This method gives re-connection attempts a greater chance to succeed and prevents call set-up failures due to an inability to perform integrity protection. By adding a decision-point based on whether un-used keys from a previous connection attempt are available at a UE, the method ensures that the integrity protection COUNT values for the UE and network will be synchronized.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, and the like, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. An integrity protection count synchronization method comprising:

establishing an RRC connection to a network;

initiating, by a user equipment, a second signaling connection to a second domain in the network while the user equipment already has a first signaling connection to a first domain in the network, both the first signaling connection and the second signaling connection using the RRC connection;

determining if new security keys from the second domain are pending at the user equipment;

sending a START value of 0 in an initial direct transfer message, if new security keys are pending at the user equipment; and maintaining the RRC connection.

2. A method according to claim 1 wherein determining if new security keys are pending at the user equipment comprises:

checking for a variable at the user equipment indicating that unused security keys are pending.

3. A method according to claim 1 wherein the network is a Third Generation Partnership Project network.

4. A method according to claim 1 further comprising:

sending a non-zero START value in the initial direct transfer message, if no new security keys are pending at the user equipment.

5. A method according to claim 4 wherein the non-zero START value is determined from a Universal Subscriber Interface Module.

6. A method according to claim 1 wherein the second domain is a packet-switched domain and the first domain is a circuit-switched domain.

7. A method according to claim 1 wherein the second domain is a circuit-switched domain and the first domain is a packet-switched domain.

8. A method according to claim 1 further comprising:

releasing a signaling connection to the second domain prior to completion of a security mode procedure, prior to initiating.

9. A method according to claim 8 wherein the first domain is packet-switched and the second domain is circuit-switched.

10. A method according to claim 8 wherein the first domain is circuit-switched and the second domain is packet-switched.

11. A method according to claim 8 further comprising:

sending an initial direct transfer message with a non-zero START value in the second domain, if no new security keys are pending for the second domain.

12. A method according to claim 11 wherein the non-zero START value is derived from a Universal Subscriber Interface Module.

* * * * *